United States Patent
Bertagnolli et al.

(10) Patent No.: US 9,103,172 B1
(45) Date of Patent: *Aug. 11, 2015

(54) POLYCRYSTALLINE DIAMOND COMPACT INCLUDING A PRE-SINTERED POLYCRYSTALLINE DIAMOND TABLE INCLUDING A NONMETALLIC CATALYST THAT LIMITS INFILTRATION OF A METALLIC-CATALYST INFILTRANT THEREIN AND APPLICATIONS THEREFOR

(75) Inventors: Kenneth E. Bertagnolli, Riverton, UT (US); Michael A. Vail, Genola, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 21 days.

This patent is subject to a terminal disclaimer.

(21) Appl. No.: 12/495,986

(22) Filed: Jul. 1, 2009

Related U.S. Application Data

(63) Continuation-in-part of application No. 12/185,457, filed on Aug. 4, 2008, now Pat. No. 8,734,552, which is a continuation-in-part of application No. 11/210,292, filed on Aug. 24, 2005, now Pat. No. 7,635,035.

(51) Int. Cl.
*B24D 3/02* (2006.01)
*C09C 1/68* (2006.01)
*C09K 3/14* (2006.01)
*E21B 10/567* (2006.01)

(52) U.S. Cl.
CPC ......... *E21B 10/567* (2013.01); *B23B 2226/315* (2013.01)

(58) Field of Classification Search
USPC .......................................................... 51/307
See application file for complete search history.

(56) References Cited

U.S. PATENT DOCUMENTS

| | | | |
|---|---|---|---|
| 3,745,623 | A | 7/1973 | Wentorf, Jr. et al. |
| 4,224,380 | A | 9/1980 | Bovenkerk et al. |
| 4,268,276 | A | 5/1981 | Bovenkerk |
| 4,274,900 | A | 6/1981 | Mueller et al. |
| 4,311,490 | A | 1/1982 | Bovenkerk et al. |
| 4,333,986 | A | 6/1982 | Tsuji et al. |
| 4,410,054 | A | 10/1983 | Nagel et al. |

(Continued)

OTHER PUBLICATIONS

Minoru Akaishi, Hisao Kanda and Shinobu Yamaoka, "Synthesis of Diamond From Graphite-Carbonate Systems Under Very High Temperature and Pressure", Journal of Crystal Growth 104 (1990), pp. 578-581.

(Continued)

*Primary Examiner* — Kaj K Olsen
*Assistant Examiner* — Ross J Christie
(74) *Attorney, Agent, or Firm* — Dorsey & Whitney LLP

(57) ABSTRACT

Embodiments of the invention relate to thermally-stable polycrystalline diamond compacts ("PDCs"), and methods of fabricating such PDCs. In an embodiment, a PDC includes a substrate and a pre-sintered polycrystalline diamond ("PCD") table bonded to the substrate. The pre-sintered PCD table includes bonded diamond grains defining a plurality of interstitial regions. The pre-sintered PCD table further including a first region remote from the substrate including a nonmetallic catalyst and a metallic catalyst each of which is disposed interstitially between the bonded diamond grains thereof, and a second region bonded to the substrate including a metallic-catalyst infiltrant disposed interstitially between the bonded diamond grains thereof. A nonplanar boundary is located between the first region and the second region.

16 Claims, 9 Drawing Sheets

(56) References Cited

U.S. PATENT DOCUMENTS

| | | | |
|---|---|---|---|
| 4,468,138 A | 8/1984 | Nagel | |
| 4,518,659 A | 5/1985 | Gigl et al. | |
| 4,525,179 A | 6/1985 | Gigl | |
| 4,556,403 A | 12/1985 | Almond et al. | |
| 4,560,014 A | 12/1985 | Geczy | |
| 4,604,106 A | 8/1986 | Hall et al. | |
| 4,629,373 A | 12/1986 | Hall | |
| 4,643,741 A | 2/1987 | Yu et al. | |
| 4,664,705 A | 5/1987 | Horton et al. | |
| 4,694,918 A | 9/1987 | Hall | |
| 4,738,322 A | 4/1988 | Hall et al. | |
| 4,738,689 A | 4/1988 | Gigl et al. | |
| 4,798,026 A | 1/1989 | Cerceau | |
| 4,811,801 A | 3/1989 | Salesky et al. | |
| 4,871,377 A | 10/1989 | Frushour | |
| 4,874,398 A | 10/1989 | Ringwood | |
| 4,906,528 A | 3/1990 | Cerceau et al. | |
| 4,907,377 A | 3/1990 | Csillag et al. | |
| 4,913,247 A | 4/1990 | Jones | |
| 4,948,388 A | 8/1990 | Ringwood | |
| 4,985,051 A | 1/1991 | Ringwood | |
| 5,009,673 A | 4/1991 | Cho | |
| 5,011,509 A | 4/1991 | Frushour | |
| 5,011,514 A | 4/1991 | Cho et al. | |
| 5,016,718 A | 5/1991 | Tandberg | |
| 5,092,687 A | 3/1992 | Hall | |
| 5,120,327 A | 6/1992 | Dennis | |
| 5,127,923 A | 7/1992 | Bunting et al. | |
| 5,135,061 A | 8/1992 | Newton, Jr. | |
| 5,151,107 A | 9/1992 | Cho et al. | |
| 5,154,245 A | 10/1992 | Waldenstrom et al. | |
| 5,180,022 A | 1/1993 | Brady | |
| 5,266,236 A | 11/1993 | Bovenkerk | |
| 5,273,557 A | 12/1993 | Cerutti et al. | |
| 5,304,342 A | 4/1994 | Hall, Jr. et al. | |
| 5,351,772 A | 10/1994 | Smith | |
| 5,364,192 A | 11/1994 | Damm et al. | |
| 5,368,398 A | 11/1994 | Damm et al. | |
| 5,370,195 A | 12/1994 | Keshavan et al. | |
| 5,435,403 A | 7/1995 | Tibbitts | |
| 5,460,233 A | 10/1995 | Meany et al. | |
| 5,480,233 A | 1/1996 | Cunningham | |
| 5,544,713 A | 8/1996 | Dennis | |
| 5,590,729 A | 1/1997 | Cooley et al. | |
| 5,605,198 A | 2/1997 | Tibbitts et al. | |
| 5,624,756 A | 4/1997 | Ueda et al. | |
| 5,769,176 A * | 6/1998 | Sumiya et al. | 175/434 |
| 5,787,022 A | 7/1998 | Tibbitts et al. | |
| 5,912,217 A | 6/1999 | Sumiya et al. | |
| 5,950,747 A | 9/1999 | Tibbitts et al. | |
| 5,967,249 A | 10/1999 | Butcher | |
| 6,021,859 A | 2/2000 | Tibbitts et al. | |
| 6,068,913 A | 5/2000 | Cho et al. | |
| 6,245,312 B1 | 6/2001 | Blank et al. | |
| 6,248,447 B1 * | 6/2001 | Griffin et al. | 428/408 |
| 6,270,548 B1 | 8/2001 | Campbell | |
| 6,315,065 B1 | 11/2001 | Yong et al. | |
| 6,344,149 B1 * | 2/2002 | Oles | 216/11 |
| 6,401,844 B1 | 6/2002 | Doster et al. | |
| 6,410,085 B1 | 6/2002 | Griffin et al. | |
| 6,435,058 B1 | 8/2002 | Matthias et al. | |
| 6,443,248 B2 | 9/2002 | Yong et al. | |
| 6,481,511 B2 | 11/2002 | Matthias et al. | |
| 6,544,308 B2 | 4/2003 | Griffin et al. | |
| 6,562,462 B2 | 5/2003 | Griffin et al. | |
| 6,576,211 B1 | 6/2003 | Davies et al. | |
| 6,585,064 B2 | 7/2003 | Griffin et al. | |
| 6,589,640 B2 | 7/2003 | Griffin et al. | |
| 6,592,985 B2 | 7/2003 | Griffin et al. | |
| 6,601,662 B2 | 8/2003 | Matthias et al. | |
| 6,739,214 B2 | 5/2004 | Griffin et al. | |
| 6,749,033 B2 | 6/2004 | Griffin et al. | |
| 6,793,681 B1 | 9/2004 | Pope et al. | |
| 6,861,098 B2 | 3/2005 | Griffin et al. | |
| 6,861,137 B2 | 3/2005 | Hughes et al. | |
| 6,878,447 B2 | 4/2005 | Griffin et al. | |
| 6,913,633 B2 * | 7/2005 | Fries et al. | 51/307 |
| 7,261,753 B2 | 8/2007 | Yamamoto et al. | |
| 7,621,974 B2 | 11/2009 | Yamamoto et al. | |
| 7,628,234 B2 | 12/2009 | Middlemiss | |
| 7,918,293 B1 | 4/2011 | Vail | |
| 2004/0060243 A1 * | 4/2004 | Fries et al. | 51/293 |
| 2004/0062928 A1 | 4/2004 | Raghavan et al. | |
| 2004/0094333 A1 * | 5/2004 | Yamamoto et al. | 175/426 |
| 2005/0019114 A1 * | 1/2005 | Sung | 51/307 |
| 2005/0044800 A1 * | 3/2005 | Hall et al. | 51/307 |
| 2005/0076897 A1 | 4/2005 | Yoshida et al. | |
| 2006/0157286 A1 * | 7/2006 | Pope | 175/374 |
| 2007/0079994 A1 | 4/2007 | Middlemiss | |
| 2007/0187154 A1 | 8/2007 | Yamamoto et al. | |
| 2007/0187155 A1 * | 8/2007 | Middlemiss | 175/428 |
| 2007/0193782 A1 | 8/2007 | Fang et al. | |
| 2008/0011522 A1 * | 1/2008 | Hall et al. | 175/434 |
| 2008/0057145 A1 * | 3/2008 | Hall et al. | 425/77 |
| 2008/0085407 A1 * | 4/2008 | Cooley et al. | 428/336 |
| 2008/0099250 A1 * | 5/2008 | Hall et al. | 175/426 |
| 2008/0115421 A1 * | 5/2008 | Sani | 51/295 |
| 2008/0206576 A1 * | 8/2008 | Qian et al. | 51/307 |
| 2008/0223623 A1 | 9/2008 | Keshavan et al. | |
| 2008/0314647 A1 * | 12/2008 | Hall et al. | 175/430 |
| 2009/0152018 A1 * | 6/2009 | Sani | 175/432 |
| 2009/0260895 A1 | 10/2009 | Vail et al. | |
| 2010/0212971 A1 * | 8/2010 | Mukhopadhyay et al. | 175/428 |

OTHER PUBLICATIONS

Minoru Akaishi, Hisao Kanda and Shinobu Yamaoka, "High Pressure Synthesis of Diamond in the Systems of Grahpite-Sulfate and Graphite-Hydroxide", Japanese Journal of Applied Physics, vol. 29, No. 7, Jul. 1990, pp. L. 1172-L 1174.

Minoru Akaishi, et al., "Phosphorus: An Elemental Catalyst for Diamond Synthesis and Growth", Science AAAS 259, 1592 (1993).

Minoru Akaishi, Shinobu Yamaoka, Fumihiro Ueda and Tadakazu Ohashi, "Synthesis of polycrystalline diamond compact with magnesium carbonate and its physical properties", Diamond and Related Materials 5 (1996) pp. 2-7.

Drs. F.P. Bundy, H.T. Hall, H.M. Strong and R.H. Wentorf, "Man-Made Diamond", Nature, vol. 176. p. 51, Jul. 9, 1955.

H.P. Bovenkerk, F.P. Bundy, R.M. Chrenko, P.J. Codella, H.M. Strong and R.H. Wentorf Jr., "Errors in diamond synthesis", Nature, vol. 365, 2 Sep. 1993 p. 19.

Drs. H.P. Bovenkerk, F.P. Bundy, H., T. Hall, H.M. Strong and R.H. Wentorf, "Preparation of Diamond", Nature, vol. 184, pp. 1094-1098, Oct. 10, 1959.

V.A. Davydov, A.V. Rakhmanina, V. Agafonov, B. Narymbetov, J.-P. Boudou and H. Szwarc, "Conversion of polycyclic aromatic hydrocarbons to graphite and diamond at high pressures", Carbon 42 (2004) pp. 261-269.

E.A. Ekimov, S. Gierlotka, I.P. Zibrov, E.L. Gromnitskaya and A. Presz, "Sintering of Diamond in the Presence of WO3", Inorganic Materials, vol. 40, No. 6, 2004, pp. 595-599.

E.A. Ekimov, V.A. Sidorov, N.N. Mel'Nik, S. Gierlotka, A. Presz, "Synthesis of Polycrystalline Diamond in the Boron Carbide-Graphite and Boron-Graphite Systems Under High Pressure and Temperature", Journal of Materials Science 39 (2004) pp. 4957-4960.

Shi-Ming Hong, Minoru Akaishi, and Shinobu Tamaoka, "High-Pressure Synthesis of Heat-Resistant Diamond Composite Using a Diamond-TiC0.6 Powder Mixture", Journal of the American Ceramic Society, vol. 82, No. 9 pp. 2497-2501 (1999).

S.M. Hong, M. Akaishi and S. Yamaoka, "Nucleation of diamond in the system of carbon and water under very high pressure and temperature", Journal of Crystal Growth 200 (1999) pp. 326-328.

Hisao Kanda, Minoru Akaishi and Shinobu Yamaoka, "New Catalysts for Diamond Growth Under High Pressure and High Temperature", Appl. Phys. Lett. 65 (6), pp. 784-786, Aug. 8, 1994.

Lin, Jerry Y.S., (2003), "Novel Inorganic Membranes for high temperatuyre carbon dioxide seperation", Final Technical Report; University of Cincinnati, Department of Chemical Engineering; pp. 1-9.

(56) References Cited

OTHER PUBLICATIONS

Emma Tomlinson, Adrian Jones and Judith Milledge, "High-Pressure Experimental Growth of Diamond Using C-K2CO3-KC1 as an Analogue for C1-Bearing Carbonate Fluid", Lithos 77 (2004) pp. 287-294.
Masao Wakatsuki, "New Catalysts for Synthesis of Diamond", Japan J. Appl. Phys. 5 (1966) p. 337.
A. Ya. Vul', V.M. Davidenko, S.V. Kidalov, S.S. Ordan'Yan, and V.A. Yashin, "Fullerenes Catalyze the Graphite-Diamond Phase Transition", Technical Physics Letters, vol. 27, No. 5, 2001, pp. 384-386.
K. Sato and T. Katsura, "Sulfur: a new solvent-catalyst for diamond synthesis under high-pressure and high-temperature conditions", Journal of Crystal Growth 223 (2001) pp. 189-194.
A.V. Shushkanova and Yu. A. Litvin, "Formation of diamond polycrystals in pyrrhotite-Carbonic Melt: Experiments at 6.7 Gpa", ISSN 1028-334X, Doklady Earth Sciences, 2006, vol. 409A, No. 6, pp. 916-920.
S.K. Singhal and H. Kanda, "Temperature dependence of growth of diamond from a Cu-C system under high pressure", Journal of Crystal Growth 154 (1995) pp. 297-302.
H. Sumiya and S. Satoh, "Synthesis of Polycrystalline Diamond with New Non-Metallic Catalyst Under High Pressure and High Temperature", International Journal of Refractory Metals & Hard Materials 17 (1999) pp. 345-350.
Yanbin Wang, Ivan G. Getting, Donald J. Weidner and Michael T. Vaughan, "Performance of Tapered Anvils in a DIA-Type, Cubic-Anvil, High-Pressure Apparatus for X Ray Diffraction Studies", Properties of Earth and Planetary Materials at High Pressure and Temperature Geophysical Monograph 101, 1998 pp. 35-39.
Nakamichi Yamasaki, Kazunori Yokosawa, Sergly Korablov and Kazuyuki Tohjt, "Synthesis of diamond particles under alkaline hydrothermal conditions", Solid State Phenomena vol. 114 (Jul. 2006) pp. 271-276.
Vail et al., U.S. Appl. No. 12/120,849, filed May 15, 2008.
Sani, U.S. Appl. No. 11/983,619, filed Nov. 9, 2007.
Bertagnolli et al., U.S. Appl. No. 11/210,292, "Polycrystalline Diamond Compact (PDC) Cutting Element Having Multiple Catalytic Elements" filed Aug. 24, 2005.
Vail et al., U.S. Appl. No. 12/185,457, "Methods of Fabricating Polycrystalline Diamond With a Carbonate Material Including at Least One Alkali Metal Carbonate, Polycrystalline Diamond So-Formed, and Applications Therefor" filed Aug. 4, 2008.
Minoru Akaishi and Shinobu Yamaoka, "Physical and chemical properties of the heat resistant diamond compacts from diamond-magnesium carbonate system", Materials Science and Engineering A209 (1996) pp. 54-59.
Y. Wang and H. Kanda, "Growth of HPHT diamonds in alkali halides: possible effects of oxygen contamination", Diamond and Related Materials 7 (1998) pp. 57-63.
Shushkanova, A.V., Litvin, Yu. A. (2008). Diamond formation in sulfide pyrrhotite-carbon melts: experiments at 6.0-7.1 GPa and application to natural conditions. Geochemistry International, 46, 1, 37-47.
Litvin, Y.A. 2003. Alkaline-chloride components in processes of diamond growth in the mantle and high-pressure experimental conditions. Doklady Earth Science 389 (3), 338-391.
U.S. Appl. No. 12/614,330, filed Nov. 6, 2009, Bertagnolli, et al.
U.S. Appl. No. 11/210,292, Dec. 2, 2009, Issue of Notification.
U.S. Appl. No. 11/210,292, Oct. 16, 2009, Notice of Allowance.
U.S. Appl. No. 11/210,292, Jun. 8, 2009, Notice of Allowance.
U.S. Appl. No. 11/210,292, Dec. 8, 2008, Office Action.
U.S. Appl. No. 11/210,292, Jul. 28, 2008, Notice of Allowance.
U.S. Appl. No. 11/210,292, Nov. 5, 2007, Office Action.
U.S. Appl. No. 11/210,292, Aug. 1, 2007, Office Action.
U.S. Appl. No. 12/614,330, Jan. 25, 2011, Notice of Allowance.
Armin Kirfel et al., "Potassium lithium carbonate, KLiCO3: Single-crystal X-ray structure analysis and thermal expansion", Zeitschrift fur Kristallographie: vol. 215, Issue 12, pp. 744 (2000).
J.E. Westraadt, N. Dubrovinskaia, J.H. Neethling and I. Sigalas, Thermally stable polycrystalline diamond sintered with calcium carbonate. Science Direct. Diamond & Related Materials 16 (2007) pp. 1929-1935.
C. Sun, H. Xie, W. Zhang, H. Yee and P. Hing, Preferential Oxidation of Diamond, J. Phys. D: Appl. Phys. 33 (2000) pp. 2196-2199.
S.N. Nazarchuck, et al. The Diamond-Tungsten Carbide Polycrystalline Composite Material. ISSN 1063-4576, Journal of Superhard Materials, 2011, vol. 33, No. 1, pp. 1-12.
H.T. Hall, Sintered Diamonds, Science vol. 169, Aug. 28, 1970, 2 pages.
D.E. Scott, The History and Impact of Synthetic Diamond Cutters and Diamond Enhanced Inserts on the Oil and Gast Industry. Industrial Diamond Review Jan. 2006, 11 pages.
M.V. Sneddon, Polycrystalline Diamond: Manufacture, Wear Mechanisms, and Implications for Bit Design. Journal of Petroleum Technology, Dec. 1988, pp. 1593-1601.
R. H. Wentforf, Sintered Superhard Materials. Science, New Seriers, vol. 208, No. 4446, Advanced Technology. (May 23, 1980) pp. 872-880.
Bex, The Influence of Temperature and Heating Time on PCD Performance. Industrial Diamond Review, 1984, vol. 44, 4 pages.
I.E. Clark, The Use of PCD for Petroleum and Mining Drilling. Industrial Diamond Review Jan. 1999, 6 pages.
Lammer, Mechanical Properties of Polycrystalline Diamonds. Materials Science and Technology, Nov. 1988, vol. 4, 7pages.
Z.J. Lin, Superhard Diamond/Tungsten Carbide Nanocomposites. Applied Physics Letters, 98, 121914 (2011), 3 pages.
J. Qian, High-Pressure, High-Temperature Sintering of Diamond-SiC Composites by Ball-Milled Diamond-Si Mixtures. J. Mater. Res., vol. 17, No. 8, Aug. 2002, pp. 2153-2160.
U.S. Appl. No. 12/185,457, May 24, 2011, Office Action.
U.S. Appl. No. 13/093,572, Jun. 9, 2011, Office Action.
U.S. Appl. No. 13/093,572, Sep. 22, 2011, Notice of Allowance.
U.S. Appl. No. 12/185,457, Aug. 13, 2012, Office Action.
U.S. Appl. No. 13/284,713, May 9, 2012, Office Action.
U.S. Appl. No. 12/185,457, Dec. 21, 2012, Office Action.
U.S. Appl. No. 13/284,713, Aug. 29, 2012, Notice of Allowance.
U.S. Appl. No. 13/284,713, Dec. 2, 2012, Issue Notification.
U.S. Appl. No. 13/284,713, Oct. 28, 2011, Bertagnolli, et al.
U.S. Appl. No. 12/614,330, May 11, 2011, Issue Notification.
U.S. Appl. No. 12/185,457, Dec. 20, 2011, Office Action.
U.S. Appl. No. 13/093,572, Nov. 2, 2011, Issue Notification.
U.S. Appl. No. 13/284,713, Jan. 26, 2012, Office Action.
U.S. Appl. No. 14/253,722, filed Apr. 15, 2014, Vail et al.
U.S. Appl. No. 12/185,457, Jan. 17, 2014, Notice of Allowance.
U.S. Appl. No. 12/185,457, May 7, 2014, Issue Notification.

* cited by examiner

POLYCRYSTALLINE DIAMOND COMPACT INCLUDING A PRE-SINTERED POLYCRYSTALLINE DIAMOND TABLE INCLUDING A NONMETALLIC CATALYST THAT LIMITS INFILTRATION OF A METALLIC-CATALYST INFILTRANT THEREIN AND APPLICATIONS THEREFOR

CROSS-REFERENCE TO RELATED APPLICATIONS

This application is a continuation-in-part of U.S. patent application Ser. No. 12/185,457 filed on Aug. 4, 2008, entitled METHODS OF FABRICATING POLYCRYSTALLINE DIAMOND WITH A CARBONATE MATERIAL INCLUDING AT LEAST ONE ALKALI METAL CARBONATE, POLYCRYSTALLINE DIAMOND SO-FORMED, AND APPLICATIONS THEREFOR, which is a continuation-in-part of U.S. patent application Ser. No. 11/210,292 filed Aug. 24, 2005 entitled POLYCRYSTALLINE DIAMOND COMPACT (PDC) CUTTING ELEMENT HAVING MULTIPLE CATALYTIC ELEMENTS, the disclosures of each of the foregoing applications are incorporated herein, in their entirety, by this reference.

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer commonly known as a diamond table. The diamond table is formed and bonded to a substrate using a high-pressure/high-temperature ("HPHT") process. The PDC cutting element may also be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented-carbide substrate into a container or cartridge with a volume of diamond particles positioned on a surface of the cemented-carbide substrate. A number of such cartridges may be loaded into an HPHT press. The substrate(s) and volume of diamond particles are then processed under HPHT conditions in the presence of a catalyst material that causes the diamond particles to bond to one another to form a matrix of bonded diamond grains defining a polycrystalline diamond ("PCD") table. The catalyst material is often a metallic catalyst (e.g., cobalt, nickel, iron, or alloys thereof) that is used for promoting intergrowth of the diamond particles.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to promote intergrowth between the diamond particles, which results in the formation of a matrix of bonded diamond grains having diamond-to-diamond bonding therebetween, with interstitial regions between the bonded diamond grains being occupied by the solvent catalyst.

The presence of the solvent catalyst in the PCD table is believed to reduce the thermal stability of the PCD table at elevated temperatures. For example, the difference in thermal expansion coefficient between the diamond grains and the solvent catalyst is believed to lead to chipping or cracking of the PCD table during drilling or cutting operations, which consequently can degrade the mechanical properties of the PCD table or cause failure. Additionally, some of the diamond grains can undergo a chemical breakdown or back-conversion to graphite via interaction with the solvent catalyst. At elevated high temperatures, portions of diamond grains may transform to carbon monoxide, carbon dioxide, graphite, or combinations thereof, causing degradation of the mechanical properties of the PCD table.

One conventional approach for improving the thermal stability of PDCs is to at least partially remove the solvent catalyst from the PCD table of the PDC by acid leaching. In another conventional approach for forming a PDC, a sintered PCD table may be separately formed and then leached to remove the solvent catalyst from interstitial regions between bonded diamond grains. The leached PCD table may be simultaneously HPHT bonded to a cemented-carbide substrate and infiltrated with silicon in a separate HPHT process. The silicon may infiltrate the interstitial regions of the leached PCD table from which the solvent catalyst has been leached and react with the diamond grains to form silicon carbide. However, silicon may reduce the strength of the bond between the PCD table and the cemented-carbide substrate, react with the diamond grains to consume portions thereof, and cause other processing problems.

Despite the availability of a number of different PDCs, manufacturers and users of PDCs continue to seek PDCs that exhibit improved toughness, wear resistance, and/or thermal stability.

SUMMARY

Embodiments of the invention relate to PDCs comprising a pre-sintered PCD table including a nonmetallic catalyst infiltrated therein that limits infiltration of a metallic-catalyst infiltrant therein, and methods of fabricating such PDCs. In an embodiment, a PDC includes a substrate and a pre-sintered PCD table bonded to the substrate. The pre-sintered PCD table includes bonded diamond grains defining a plurality of interstitial regions. The pre-sintered PCD table further includes a first region remote from the substrate including a nonmetallic catalyst and a metallic catalyst each of which is disposed interstitially between the bonded diamond grains thereof, and a second region bonded to the substrate including a metallic-catalyst infiltrant disposed interstitially between the bonded diamond grains thereof. A nonplanar boundary may be located between the first region and the second region.

In an embodiment, a method of forming a PDC includes positioning an at least partially leached PCD table including a plurality of interstitial regions therein at least proximate to a cemented carbide substrate including a metallic catalyst therein and at least proximate to at least one layer including a nonmetallic catalyst. The method also includes infiltrating the nonmetallic catalyst into the interstitial regions of a first region of the at least partially leached PCD table. The method further includes infiltrating the metallic-catalyst infiltrant into the interstitial regions of a second region of the at least partially leached PCD table.

In an embodiment, a method of forming a PDC includes providing a PCD table including a plurality of bonded diamond grains defining a plurality of interstitial regions. The PCD table includes a first region having a nonmetallic catalyst disposed interstitially between the bonded diamond grains thereof and a second region that is substantially free of the nonmetallic catalyst. The method also includes positioning a cemented carbide substrate including a metallic catalyst therein adjacent to the second region of the PCD table. The method further includes infiltrating a portion of the metallic catalyst into the interstitial regions of the second region of the PCD table.

Other embodiments include applications utilizing the disclosed PDCs in various articles and apparatuses, such as rotary drill bits, bearing apparatuses, wire-drawing dies, machining equipment, and other articles and apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Embodiments of the invention relate to PDCs comprising a pre-sintered PCD table including a nonmetallic catalyst infiltrated therein that limits infiltration of a metallic-catalyst infiltrant therein, and methods of fabricating such PDCs. The disclosed PDCs comprise a substrate and a pre-sintered PCD table including a first region having a nonmetallic catalyst and a metallic catalyst, a second region that includes a metallic-catalyst infiltrant, and a nonplanar boundary formed between the first and second regions exhibiting a geometry characteristic of the metallic-catalyst infiltrant being partially infiltrated into the pre-sintered PCD table. The PDCs disclosed herein may be used in a variety of applications, such as rotary drill bits, bearing apparatuses, wire-drawing dies, machining equipment, and other articles and apparatuses.

Figure 1:
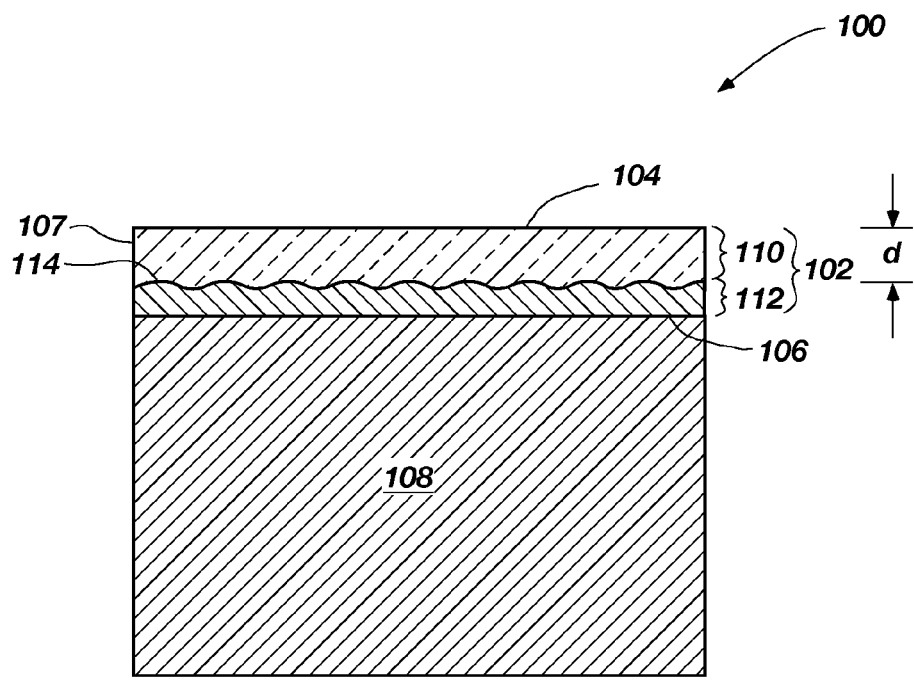
FIG. 1 is a cross-sectional view of an embodiment of a PDC.

FIG. 1 is a cross-sectional view of an embodiment of a PDC 100 including a pre-sintered PCD table 102 infiltrated with a nonmetallic catalyst that limits infiltration of a metallic-catalyst infiltrant therein. The PCD table 102 includes a working upper surface 104, a generally opposing interfacial surface 106, and at least one lateral surface 107 extending therebetween. It is noted that at least a portion of the at least one lateral surface 107 may also function as a working surface that contacts a subterranean formation during drilling. Additionally, the PCD table 102 may include a chamfer that extends about the upper surface 104 thereof or other edge geometry.

The interfacial surface 106 of the PCD table 102 is bonded to a substrate 108. The substrate 108 may include, without limitation, cemented carbides, such as tungsten carbide, titanium carbide, chromium carbide, niobium carbide, tantalum carbide, vanadium carbide, or combinations thereof cemented with iron, nickel, cobalt, or alloys thereof. In an embodiment, the substrate 108 comprises cobalt-cemented tungsten carbide. Although the interfacial surface 106 of the PCD table 102 is depicted in FIG. 1 as being substantially planar, in other embodiments, the interfacial surface 106 may exhibit a selected nonplanar topography and the substrate 108 may exhibit a correspondingly configured interfacial surface or other selected interfacial surface.

The PCD table 102 includes a plurality of directly bonded-together diamond grains having diamond-to-diamond bonding (e.g., $sp^3$ bonding) therebetween. The plurality of bonded diamond grains define a plurality of interstitial regions. The PCD table 102 includes a thermally-stable first region 110 remote from the substrate 108 that extends inwardly from the upper surface 104 to an indeterminate depth d within the PCD table 102. As used herein, the phrase "thermally-stable region" refers to a region of a PCD table that exhibits a relatively increased thermal stability compared to one or more other regions of the same PCD table. The first region 110 includes a first portion of the interstitial regions. A second region 112 of the PCD table 102 adjacent to the substrate 108 includes a second portion of the interstitial regions.

The interstitial regions of the first region 110 include a nonmetallic catalyst and a metallic catalyst disposed therein. The metallic catalyst is also present in the second region 112. The metallic catalyst present in the first region 110 and the second region 112 was used to initially catalyze formation of diamond-to-diamond bonding between the diamond grains of the pre-sintered PCD table 102, and a residual amount of the metallic catalyst may be present throughout the PCD table 102 and disposed in the interstitial regions of the first and second regions 110 and 112 that was not removed in a leaching process. The residual metallic catalyst may comprise iron, nickel, cobalt, or alloys thereof. For example, the residual metallic catalyst may be present in the PCD table 102 in amount of about 0.8 weight % to about 1.50 weight % and, more particularly, about 0.86 weight % to about 1.47 weight %. Even though the nonmetallic catalyst present in the first region 110 is capable of catalyzing formation of diamond, the nonmetallic catalyst present in the first region 110 may not back convert the diamond grains of the first region 110 to graphite and/or other by-product under typical drilling conditions encountered during use of the PDC 100 as a subterranean cutting element. Depending upon the HPHT conditions used to form the PDC 100, the nonmetallic catalyst may catalyze formation of additional diamond-to-diamond bonding that was not initially catalyzed due to the metallic catalyst.

The first region 110 may exhibit a number of different edge and side geometries. For example, the first region 110 may include an edge chamfer between the upper surface 104 and the at least one lateral surface 107, and the first region 110 may extend along at least a portion of the at least one lateral surface 107.

The interstitial regions of the second region 112 includes a metallic-catalyst infiltrant infiltrated from the substrate 108. For example, the metallic-catalyst infiltrant may comprise iron, nickel, cobalt, or alloys thereof.

A nonplanar boundary 114 may be formed between the first region 110 and the second region 112 of the PCD table 102. The nonplanar boundary 114 exhibits a geometry characteristic of the metallic-catalyst infiltrant being only partially infiltrated into the second region 112 of the PCD table 102. If the metallic-catalyst infiltrant had infiltrated the entire PCD table 102 so that the interstitial regions of the first region 110 were also occupied by the metallic catalyst and subsequently removed in a leaching process to the intermediate depth d, a boundary between the first region 110 and the second region 112 would be substantially planar and indicative of being defined by a leaching process.

In an embodiment, the intermediate depth d to which the first region 110 extends may be almost the entire thickness of the PCD table 102. In another embodiment, the intermediate depth d may be about 50 μm to about 500 μm, about 200 μm to about 400 μm, or about 300 μm to about 450 μm. In another embodiment, the intermediate depth d may be about 0.2 mm to about 1.5 mm, about 0.5 mm to about 1.0 mm, about 0.65 mm to about 0.9 mm, or about 0.75 mm to about 0.85 mm. As the intermediate depth d of the first region 110 increases, the wear resistance and thermal stability of the PCD table 102 may increase.

The illustrated embodiment shown in FIG. 1 is described as having the interstitial regions of the first region 110 of the PCD table 102 being substantially filled with the nonmetallic catalyst. However, in an embodiment, the nonmetallic catalyst may be substantially removed after infiltration by, for example, vacuum evaporation or another suitable technique. Even after removal, a residual, identifiable amount of the nonmetallic catalyst may remain in the interstitial regions of the first region 110 of the PCD table 102.

The nonmetallic catalyst of the first region 110 of the PCD table 102 may be selected from an inorganic nonmetallic catalyst, an organic nonmetallic catalyst, and combinations of the foregoing. For example, the nonmetallic catalyst may be selected from a carbonate, a sulfate and/or derivatives thereof, a hydroxide, elemental phosphorous, a chloride, elemental sulfur, a polycyclic aromatic hydrocarbon and/or derivatives thereof, a chlorinated hydrocarbon and/or derivatives thereof, a semiconductor material, and combinations of the foregoing.

In an embodiment, the carbonate may be selected from one or more alkali metal carbonates (e.g., one or more carbonates of Li, Na, and K), one or more alkaline earth metal carbonates (e.g., one or more carbonates of Be, Mg, Ca, Sr, and Ba), and combinations of the foregoing. In an embodiment, the sulfate may be selected from one or more alkali metal sulfates (e.g., one or more sulfates of Li, Na, and K), one or more alkaline earth metal sulfates (e.g., one or more sulfates of Be, Mg, Ca, Sr, and Ba), and combinations of the foregoing. In an embodiment, the hydroxide may be selected from one or more alkaline earth metal hydroxides, such as one or more hydroxides of Be, Mg, Ca, Sr, and Ba. In an embodiment, the polycyclic aromatic hydrocarbon may be selected from naphthalene, anthracene, pentacene, perylene, coronene, derivatives of the foregoing, and combinations of the foregoing. In an embodiment, the chloride may be selected from one or more alkali metal chlorides, such as one or more chlorides of Li, Na, and K. In some embodiments, the nonmetallic catalyst may be a combination of one or more of the aforementioned chlorides and one or more of the aforementioned carbonates. In an embodiment, the chlorinated hydrocarbon may be selected from dichloromethane; 1,1,1-tricholorethane; derivatives of the foregoing; and combinations of the foregoing. In an embodiment, the semiconductor material may be selected from germanium, a germanium alloy, and combinations of the foregoing.

Figure 2:
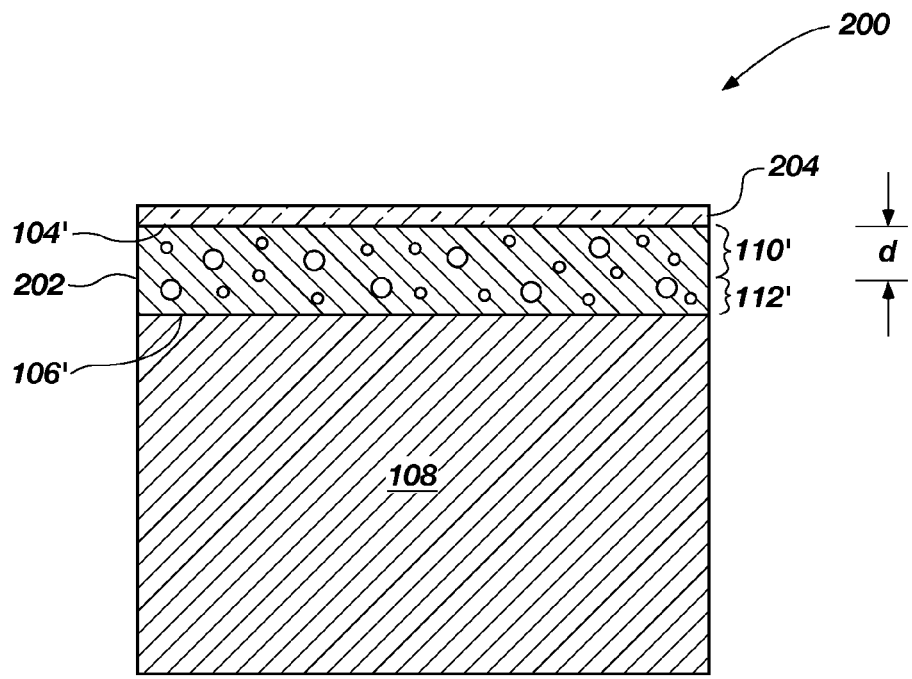
FIG. 2 is a cross-sectional view of an assembly to be processed under HPHT conditions to form the PDC shown in FIG. 1 according to an embodiment of method.

FIG. 2 is a cross-sectional view of an assembly 200 to be processed under HPHT conditions to form the PDC 100 shown in FIG. 1 according to an embodiment of a method. The assembly 200 includes an at least partially leached PCD table 202 disposed between the substrate 108 and at least one layer 204 including one or more of the aforementioned nonmetallic catalysts. The at least partially leached PCD table 202 includes an upper surface 104' and a back surface 106'. The at least partially leached PCD table 202 also includes a plurality of interstitial regions that were previously completely occupied by the metallic catalyst and forms a network of at least partially interconnected pores that extend between the upper surface 104' and the back surface 106'.

The at least partially leached PCD table 202 and the layer 204 including nonmetallic catalyst may be placed in a pressure transmitting medium, such as a refractory metal can embedded in pyrophyllite or other pressure transmitting medium. The pressure transmitting medium, including the at least partially leached PCD table 202 and the at least one layer 204, may be subjected to an HPHT process using an ultra-high pressure press to create temperature and pressure conditions at which diamond is stable. The temperature of the HPHT process may be at least about 1000° C. (e.g., about 1200° C. to about 1600° C.) and the pressure of the HPHT process may be at least 4.0 GPa (e.g., about 5.0 GPa to about 8.0 GPa) for a time sufficient to infiltrate the at least partially leached PCD table 202 with the nonmetallic catalyst from the at least one layer 204 and the metallic-catalyst infiltrant from the substrate 108. The nonmetallic catalyst is capable of wetting and/or reacting with the diamond grains and filling the interstitial regions between the bonded diamond grains of the at least partially leached PCD table 202. For example, the pressure of the HPHT process may be about 5 GPa to about 7 GPa and the temperature of the HPHT process may be about 1150° C. to about 1400° C. (e.g., about 1200° C. to about 1300° C.).

During the HPHT process, the nonmetallic catalyst from the at least one layer 204 infiltrates into a first region 110' of the at least partially leached PCD table 202 prior to or substantially simultaneously with the metallic-catalyst infiltrant from the substrate 108 infiltrating into a second region 112' of the at least partially leached PCD table 202 that is located adjacent to the substrate 108. The nonmetallic catalyst from the at least one layer 204 infiltrates into the at least partially leached PCD table 202 generally to the intermediate depth d to fill the interstitial regions thereof. The amount of the nonmetallic catalyst in the at least one layer 204 may be selected so that it only infiltrates into the first region 110' of the at least partially leached PCD table 202 to the intermediate depth d.

The HPHT conditions are also sufficient to at least partially melt the metallic-catalyst infiltrant present in the substrate 108 (e.g., cobalt in a cobalt-cemented tungsten carbide substrate), which infiltrates into the interstitial regions of the second region 112' of the at least partially leached PCD table 202. However, the depth of infiltration of the metallic-catalyst infiltrant from the substrate 108 is limited by the presence of the nonmetallic catalyst in the first region 110'. Upon cooling from the HPHT process, the metallic-catalyst infiltrant infiltrated into the at least partially leached PCD table 202 forms a strong metallurgical bond between the second region 112' and the substrate 108. It should be noted that the thickness of the at least partially leached PCD table 202 may be reduced and, additional diamond may be grown therein during the HPHT process. For example, the nonmetallic catalyst may catalyze formation of additional diamond-to-diamond bonding in the first region 110' provided the HPHT conditions are properly selected form the particular nonmetallic catalyst being employed. The metallic-catalyst infiltrant may also catalyze formation of additional diamond-to-diamond bonding in the second region 112'. Before and/or after HPHT processing, the infiltrated PCD table represented as the PCD table 102 shown in FIG. 1 may be subjected to one or more types of finishing operations, such as grinding, machining, or combinations of the foregoing.

The at least partially leached PCD table 202 shown in FIG. 2 may be fabricated by subjecting a plurality of diamond particles to an HPHT sintering process in the presence of the metallic catalyst (e.g., cobalt, nickel, iron, or alloys thereof) to facilitate intergrowth between the diamond particles and form a PCD body comprised of bonded diamond grains that exhibit diamond-to-diamond bonding therebetween. For example, the metallic catalyst may be mixed with the diamond particles or infiltrated from a metallic catalyst foil or powder adjacent to the diamond particles. The bonded diamond grains define interstitial regions, with the metallic catalyst disposed within the interstitial regions. The diamond particles may exhibit a single-mode diamond particle size distribution, or a bimodal or greater diamond particle size distribution. The as-sintered PCD body may be leached by immersion in an acid, such as aqua regia, nitric acid, hydrofluoric acid, mixtures of the foregoing, or subjected to another suitable process to remove at least a portion of the metallic catalyst from the interstitial regions of the PCD body and form the at least partially leached PCD table 202. For example, the as-sintered PCD body may be immersed in the acid for about 2 to about 7 days (e.g., about 3, 5, or 7 days) or for a few weeks (e.g., about 4 weeks) depending on the process employed. It is noted that when the metallic catalyst is infiltrated into the diamond particles from a cemented tungsten carbide substrate including tungsten carbide particles cemented with a metallic catalyst (e.g., cobalt, nickel, iron, or alloys thereof), the infiltrated metallic catalyst may carry a tungsten-containing material (e.g., tungsten and/or tungsten carbide) therewith and the as-sintered PCD body may include such tungsten-containing material therein disposed interstitially between the bonded diamond grains. Depending upon the leaching process, at least a portion of the tungsten-containing material may not be substantially removed by the leaching process and may enhance the wear resistance of the at least partially leached PCD table 202.

Even after leaching, a residual amount of metallic catalyst remains in the interstitial regions between the bonded diamond grains of the at least partially leached PCD table 202 that may be identifiable using mass spectroscopy, energy dispersive x-ray spectroscopy microanalysis, or other suitable analytical technique. Such entrapped, residual metallic catalyst is difficult to remove even with extended leaching times.

The at least partially leached PCD table 202 may be subjected to at least one shaping process prior to bonding to the substrate 108, such as grinding or lapping, to tailor the geometry thereof (e.g., forming an edge chamfer), as desired, for a particular application. The as-sintered PCD body may also be shaped prior to leaching or bonding to the substrate 108 by a machining process, such as electro-discharge machining.

The plurality of diamond particles sintered to form the at least partially leached PCD table 202 may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 μm and 20 μm). More particularly, in various embodiments, the plurality of diamond particles may include a portion exhibiting a relatively larger size (e.g., 100 μm, 90 μm, 80 μm, 70 μm, 60 μm, 50 μm, 40 μm, 30 μm, 20 μm, 15 μm, 12 μm, 10 μm, 8 μm) and another portion exhibiting at least one relatively smaller size (e.g., 30 μm, 20 μm, 10 μm, 15 μm, 12 μm, 10 μm, 8 μm, 4 μm, 2 μm, 1 μm, 0.5 μm, less than 0.5 μm, 0.1 μm, less than 0.1 μm). In another embodiment, the plurality of diamond particles may include a portion exhibiting a relatively larger size between about 40 μm and about 15 μm and another portion exhibiting a relatively smaller size between about 12 μm and 2 μm. Of course, the plurality of diamond particles may also comprise three or more different sizes (e.g., one relatively larger size and two or more relatively smaller sizes) without limitation.

Figure 3:
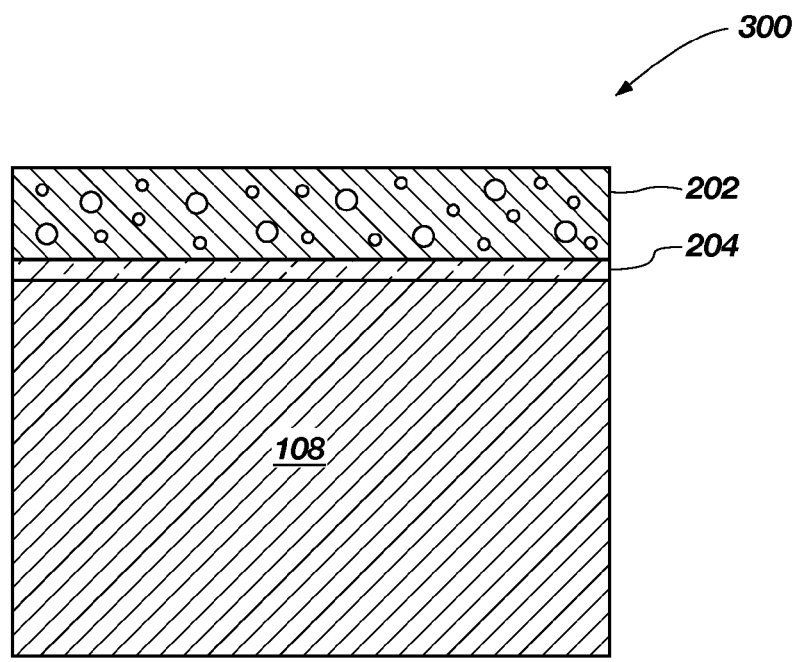
FIG. 3 is a cross-sectional view of an assembly to be HPHT processed to form the PDC shown in FIG. 1 according to another embodiment of method.

FIG. 3 is a cross-sectional view of an assembly 300 to be HPHT processed to form the PDC shown in FIG. 1 according to another embodiment of method. The at least one layer 204 including the nonmetallic catalyst therein may be positioned between the at least partially leached PCD table 202 and the substrate 108 to form the assembly 300. The assembly 300 may be enclosed in a suitable pressure transmitting medium and subjected to an HPHT process to form the PDC 100 (FIG. 1) using the same or similar HPHT conditions previously discussed with respect to HPHT processing the assembly 200 shown in FIG. 2.

Figure 4A:
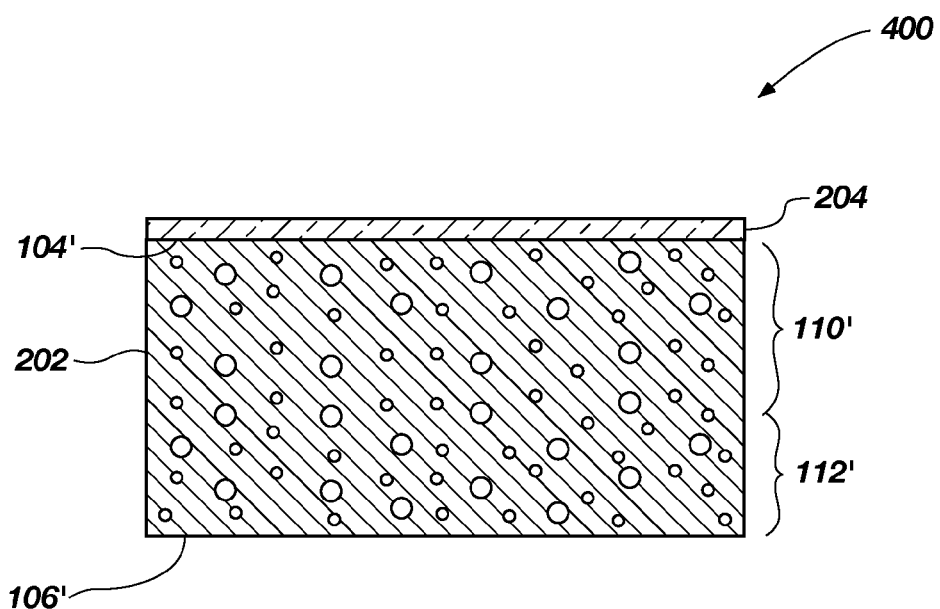
FIGS. 4A and 4B are cross-sectional views at different stages during another embodiment of a method for fabricating the PDC shown in FIG. 1.
Figure 4B:
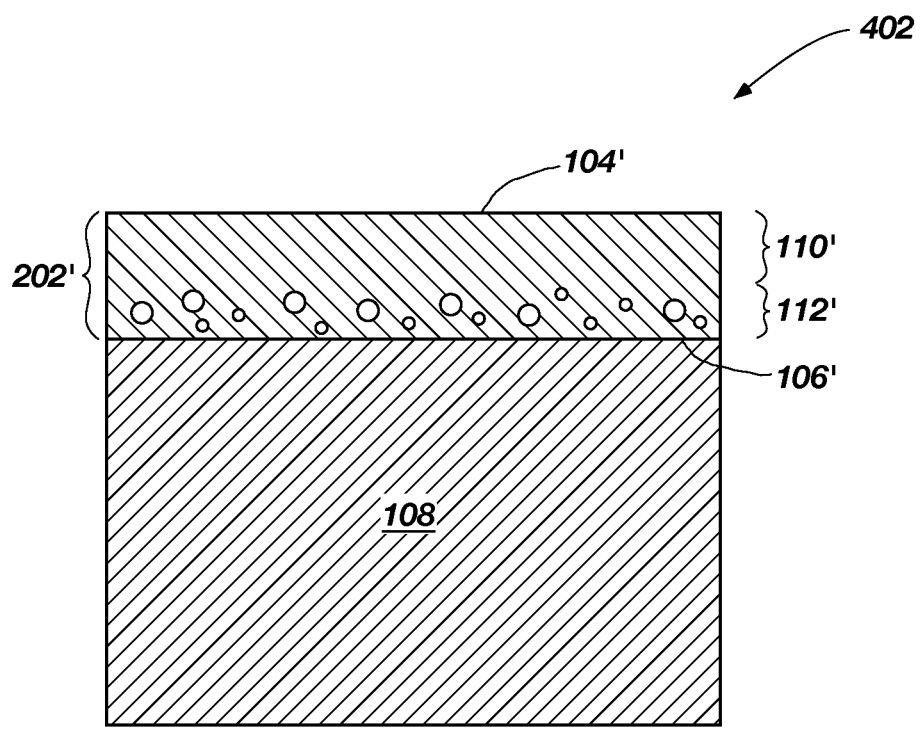

FIGS. 4A and 4B are cross-sectional views at different stages during another embodiment of a method for fabricating the PDC 100 shown in FIG. 1. Referring to FIG. 4A, the at least partially leached PCD table 202 may be provided that includes the upper surface 104' and the back surface 106'. The least one layer 204 including the nonmetallic catalyst therein may be positioned adjacent to the upper surface 104' to form the assembly 400, such as by coating the upper surface 104' with the at least one layer 204 or disposing the at least one layer 204 in the bottom of a container and placing the at least partially leached PCD table 202 in the container and in contact with the at least one layer 204.

The assembly 400 may be enclosed in a suitable pressure transmitting medium and subjected to an HPHT process using the HPHT conditions used to HPHT process the assembly 200 shown in FIG. 2. During the HPHT process, the nonmetallic catalyst of the at least one layer 204 may partially or substantially completely melt and infiltrate into the interstitial regions of the first region 110' of the at least partially leached PCD table 202 to form a partially infiltrated PCD table 202' (FIG. 4B). The volume of the nonmetallic catalyst may be selected so that it is sufficient to only fill the interstitial regions of the selected first region 110'. Thus, the interstitial regions of the second region 112' are not infiltrated with the nonmetallic catalyst and, thus, are substantially free of nonmetallic catalyst.

In another embodiment, when the nonmetallic catalyst in the at least one layer 204 melts or begins melting at a sufficiently low temperature so the infiltration can be performed without significantly damaging the diamond grains of the at least partially leached PCD table 202, the nonmetallic catalyst may be infiltrated into the at least partially leached PCD table 202 under atmospheric pressure conditions or in a hot-isostatic pressing ("HIP") process. For example, one suitable nonmetallic catalyst may comprise a eutectic or near eutectic mixture of lithium carbonate, sodium carbonate, and potassium carbonate.

Referring to FIG. 4B, the back surface 106' of the partially infiltrated PCD table 202' may be positioned adjacent to the substrate 108 to form an assembly 402. The assembly 402 may be subjected to an HPHT process using the HPHT conditions used to HPHT process the assembly 200 shown in FIG. 2. During the HPHT process, a metallic-catalyst infiltrant present in the substrate 108 may liquefy, and infiltrate into and occupy the interstitial regions of the second region 112'. Upon cooling from the HPHT process, the metallic-catalyst infiltrant forms a strong metallurgical bond between the substrate 108 and the second region 112'.

In an embodiment, the nonmetallic catalyst of the at least one layer 204 comprises a mixture of alkali metal carbonates. For example, according to one embodiment, the nonmetallic catalyst may comprise lithium carbonate, sodium carbonate, and potassium carbonate present in selected proportions at or near a ternary eutectic composition (e.g., a eutectic composition, a hypereutectic composition, or a hypoeutectic composition) for the lithium carbonate-sodium carbonate-potassium carbonate chemical system. In the lithium carbonate-sodium carbonate-potassium carbonate chemical system, the ternary eutectic composition occurs when the lithium carbonate is present in an amount of about 43.5 atomic percent, the sodium carbonate is present in an amount of about 31.5 atomic percent, and the potassium carbonate is present in an amount about 25 atomic percent and the ternary eutectic temperature is about 397° C. at approximately 1 atmosphere and about 1100° C. to about 1300° C. at approximately 7.7 GPa. Other nonmetallic catalyst compositions are disclosed in U.S. patent application Ser. No. 12/185,457, the disclosure of which is incorporated herein, in its entirety, by this reference. The at least one layer 204 may include any of the nonmetallic catalyst compositions disclosed in U.S. patent application Ser. No. 12/185,457. In such an embodiment, the HPHT process may employ a pressure of about 6 GPa to about 8 GPa and a temperature of about 1100° C. to about 1300° C. to catalyze additional diamond growth in the first region 110' of the at least partially leached PCD table 202. When the metallic catalyst includes one or more alkaline earth metal carbonates, the temperature of the HPHT process may be increased to about 1900° C. to about 2200° C.

In an embodiment, the nonmetallic catalyst of the at least one layer 204 comprises one or more of the aforementioned alkaline earth metal sulfates and/or one or more of the aforementioned alkaline earth metal hydroxides. In such an embodiment, the HPHT process may employ a pressure of about 6 GPa to about 8 GPa and a temperature of about 1900° C. to about 2200° C. to catalyze additional diamond growth in the first region 110' of the at least partially leached PCD table 202.

In an embodiment, the nonmetallic catalyst of the at least one layer 204 comprises elemental phosphorous (e.g., high-purity red phosphorous powder), elemental sulfur (e.g., sulfur powder), or combinations of the foregoing. In such an embodiment, the HPHT process may employ a pressure of about 6 GPa to about 9 GPa (e.g., about 7 GPa to about 8 GPa) and a temperature of about 1900° C. to about 2200° C. (e.g., about 1600° C. to about 1800° C.) sufficient to catalyze additional diamond growth in the first region 110' of the at least partially leached PCD table 202. The HPHT conditions are also sufficient to liquefy the elemental phosphorous and/or the elemental sulfur.

In an embodiment, the nonmetallic catalyst of the at least one layer 204 comprises one or more of the aforementioned aromatic polycyclic aromatic hydrocarbons. For example, such aromatic polycyclic aromatic hydrocarbons may in powder form, in the form of a disc, or combinations of the foregoing. In such an embodiment, the HPHT process may employ a pressure of about 6 GPa to about 8 GPa and a temperature of about 1100° C. to about 1700° C. (e.g., about 1400° C. to about 1500° C.) to catalyze additional diamond growth in the first region 110 of the at least partially leached PCD table 202.

Referring again to FIG. 1, following HPHT processing to form the PDC 100, a portion of or substantially all of the nonmetallic catalyst present in the first region 110 of the PCD table 102 may be removed. For example, in an embodiment, the nonmetallic catalyst present in the first region 110 may be removed by heating the PDC 100 under a partial vacuum until a desired amount of the nonmetallic catalyst evaporates.

When the nonmetallic catalyst infiltrated into the at least partially leached PCD table 202 comprises one or more alkali metal carbonates, one or more alkaline earth metal carbonates, or combinations of the foregoing, the metal carbonates present in the interstitial regions of the first region 110 of the PCD table 102 may be converted to one or more corresponding metal oxides by heat treatment of the PDC 100. For example, the PDC 100 may be heated in air, argon, nitrogen, or partial vacuum at a temperature of about 800° C. to about 1400° C. to partially or substantially completely convert the metal carbonates to corresponding metal oxides.

Figure 5:
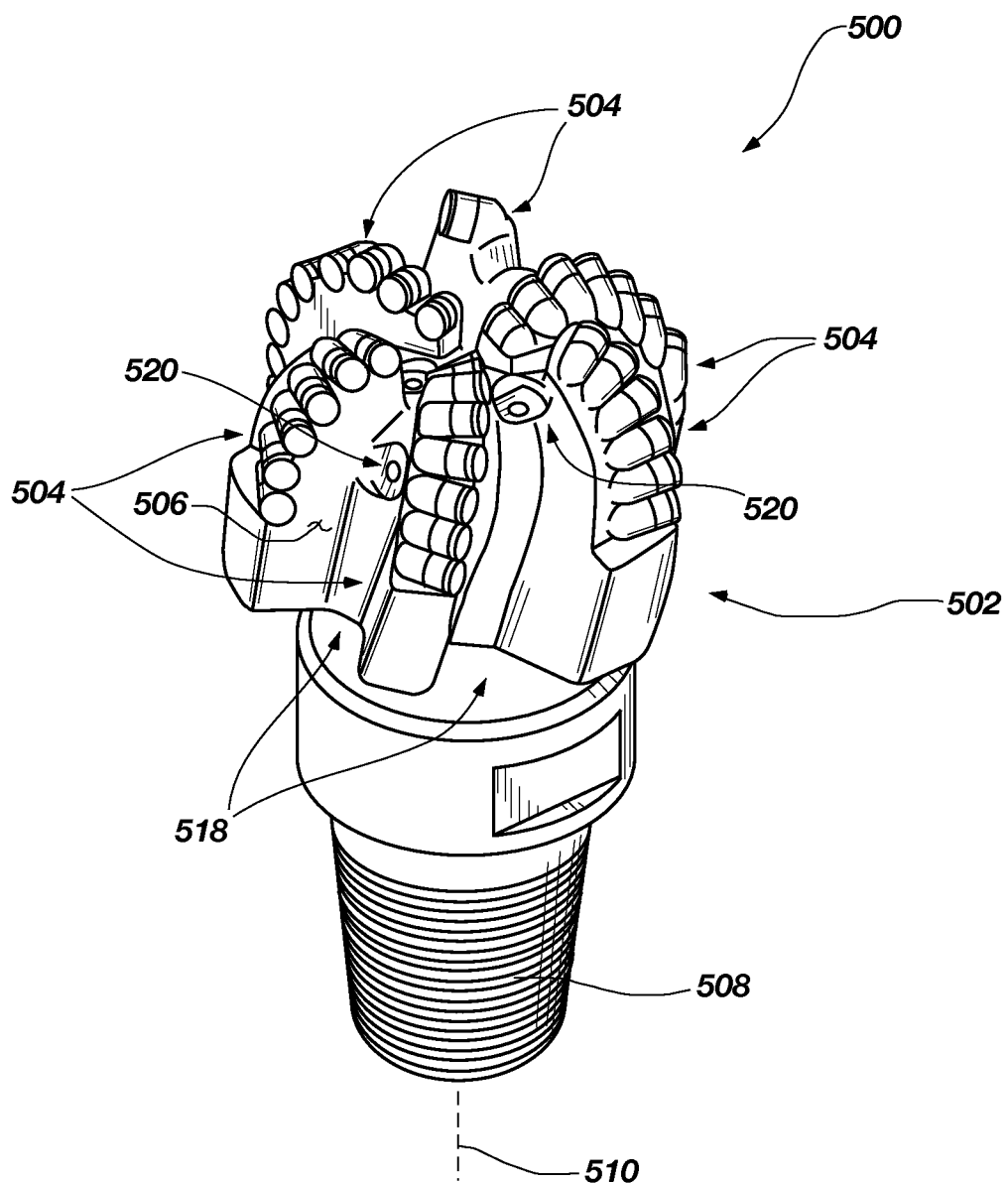
FIG. 5 is an isometric view of an embodiment of a rotary drill bit that may employ one or more of the disclosed PDC embodiments.
Figure 6:
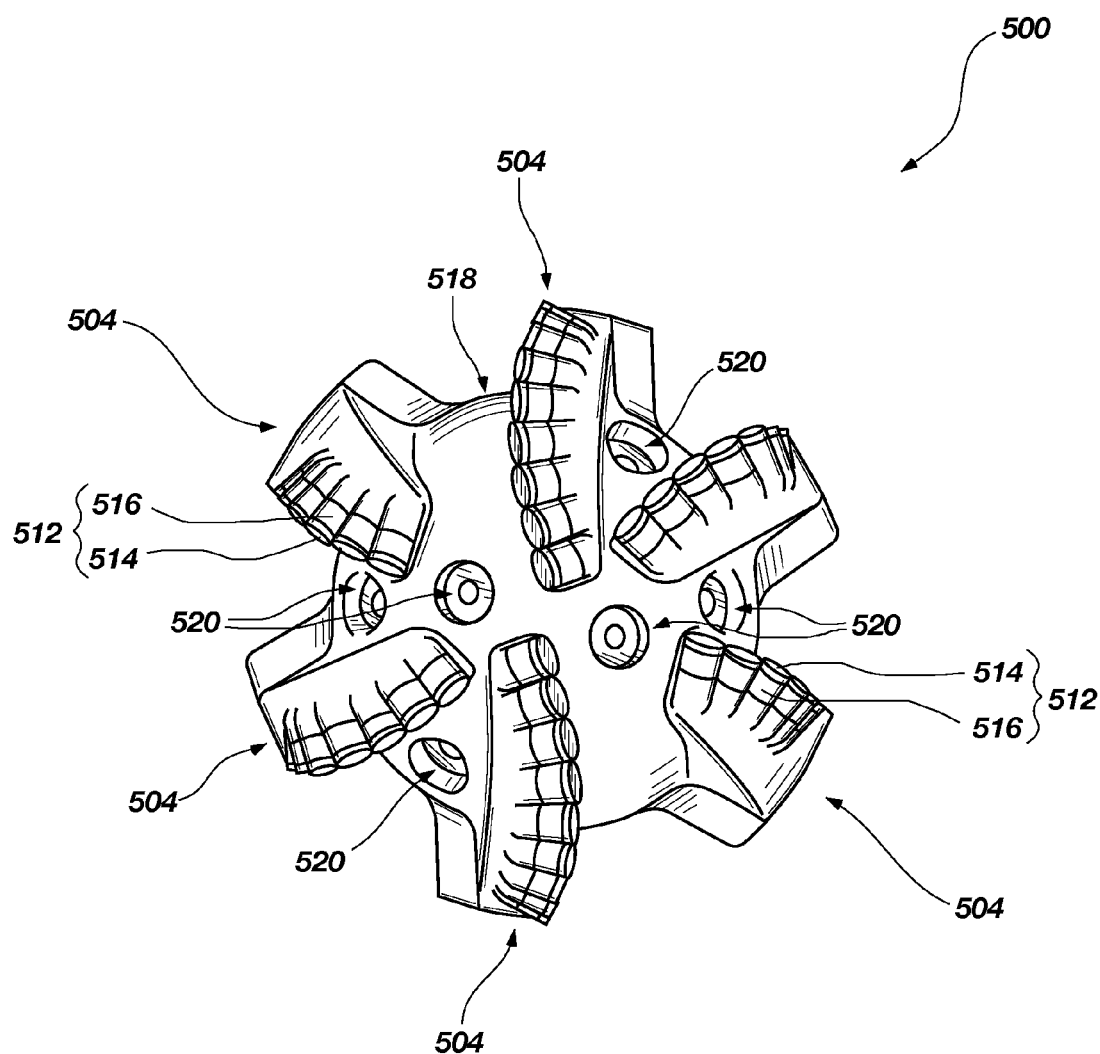
FIG. 6 is a top elevation view of the rotary drill bit shown in FIG. 5.

FIG. 5 is an isometric view and FIG. 6 is a top elevation view of an embodiment of a rotary drill bit 500 that includes at least one PDC configured according to any of the disclosed PDC embodiments. The rotary drill bit 500 comprises a bit body 502 that includes radially and longitudinally extending blades 504 having leading faces 506, and a threaded pin connection 508 for connecting the bit body 502 to a drilling string. The bit body 502 defines a leading end structure for drilling into a subterranean formation by rotation about a longitudinal axis 510 and application of weight-on-bit. At least one PDC, configured according to any of the previously described PDC embodiments, may be affixed to the bit body 502. With reference to FIG. 6, a plurality of PDCs 512 are secured to the blades 504 of the bit body 502 (FIG. 5). For example, each PDC 512 may include a PCD table 514 bonded to a substrate 516. More generally, the PDCs 512 may comprise any PDC disclosed herein, without limitation. In addition, if desired, in some embodiments, a number of the PDCs 512 may be conventional in construction. Also, circumferentially adjacent blades 504 define so-called junk slots 518 therebetween. Additionally, the rotary drill bit 500 includes a plurality of nozzle cavities 520 for communicating drilling fluid from the interior of the rotary drill bit 500 to the PDCs 512.

FIGS. 5 and 6 merely depict one embodiment of a rotary drill bit that employs at least one PDC fabricated and structured in accordance with the disclosed embodiments, without limitation. The rotary drill bit 500 is used to represent any number of earth-boring tools or drilling tools, including, for example, core bits, roller-cone bits, fixed-cutter bits, eccentric bits, bicenter bits, reamers, reamer wings, or any other downhole tool including superabrasive compacts, without limitation.

The PDCs disclosed herein (e.g., PDC 100 of FIG. 1) may also be utilized in applications other than cutting technology. For example, the disclosed PDC embodiments may be used in wire dies, bearings, artificial joints, inserts, cutting elements, and heat sinks. Thus, any of the PDCs disclosed herein may be employed in an article of manufacture including at least one superabrasive element or compact.

Thus, the embodiments of PDCs disclosed herein may be used in any apparatus or structure in which at least one conventional PDC is typically used. In one embodiment, a rotor and a stator, assembled to form a thrust-bearing apparatus, may each include one or more PDCs (e.g., PDC 100 of FIG. 1) configured according to any of the embodiments disclosed herein and may be operably assembled to a downhole drilling assembly. U.S. Pat. Nos. 4,410,054; 4,560,014; 5,364,192; 5,368,398; and 5,480,233, the disclosure of each of which is incorporated herein, in its entirety, by this reference, disclose subterranean drilling systems within which bearing apparatuses utilizing superabrasive compacts disclosed herein may be incorporated. The embodiments of PDCs disclosed herein may also form all or part of heat sinks, wire dies, bearing elements, cutting elements, cutting inserts (e.g., on a roller-cone-type drill bit), machining inserts, or any other article of manufacture as known in the art. Other examples of articles of manufacture that may use any of the PDCs disclosed herein are disclosed in U.S. Pat. Nos. 4,811,801; 4,274,900; 4,268,276; 4,468,138; 4,738,322; 4,913,247; 5,016,718; 5,092,687; 5,120,327; 5,135,061; 5,154,245; 5,180,022; 5,460,233; 5,544,713; and 6,793,681, the disclosure of each of which is incorporated herein, in its entirety, by this reference.

The following working examples set forth various formulations for forming PDCs. In the following working examples, the abrasion resistance and thermal stability of conventional working examples 1 through 2 is compared to the abrasion resistance and thermal stability of working examples 3 through 7 according to embodiments of the invention.

Comparative Example 1

A conventional PDC was obtained that was fabricated by placing a layer of diamond particles having an average particle size of about 19 µm adjacent to a cobalt-cemented tungsten carbide substrate. The layer and substrate were placed in a container assembly. The container assembly including the layer and substrate therein were subjected to HPHT conditions in an HPHT press at a temperature of about 1400° C. and a pressure of about 5 GPa to about 8 GPa to form a conventional PDC including a PCD table integrally formed and bonded to the substrate. Cobalt was infiltrated into the layer of diamond particles from the substrate catalyzing the formation of the PCD table. The thickness of the PCD table of the PDC was about 2.362 mm and an about 45 degree, 0.3433-mm chamfer was machined in the PCD table.

Figure 7:
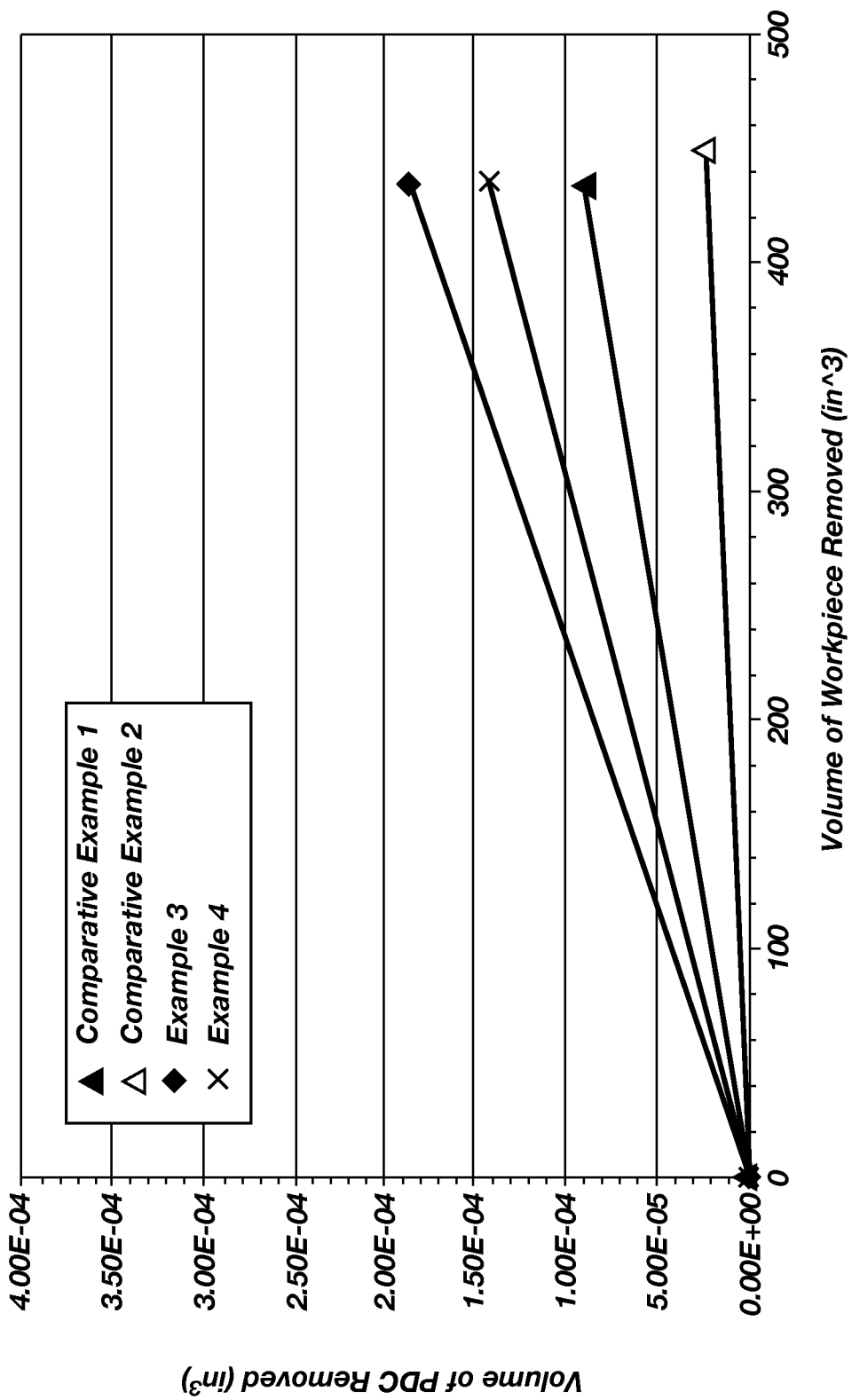
FIG. 7 is a graph of volume of PDC removed versus volume of workpiece removed for comparative examples 1 and 2, and working examples 3 and 4 according to embodiments of the invention.

The abrasion resistance of the conventional PDC of comparative example 1 was evaluated by measuring the volume of PDC removed versus the volume of Barre granite workpiece removed, while the workpiece was cooled with water. The test parameters were a depth of cut for the PDC of about 0.254 mm, a back rake angle for the PDC of about 20 degrees, an in-feed for the PDC of about 6.35 mm/rev, and a rotary speed of the workpiece to be cut of about 101 RPM. FIG. 7 shows the abrasion resistance test results for the PDC of comparative example 1.

The thermal stability of the PCD table of the conventional PDC so-formed of comparative example 1 was also evaluated by measuring the distance cut in a Barre granite workpiece prior to failure, without using coolant, in a vertical turret lathe test. The distance cut is considered representative of the thermal stability of the PCD table. The test parameters were a depth of cut for the PDC of about 1.27 mm, a back rake angle for the PDC of about 20 degrees, an in-feed for the PDC of about 1.524 mm/rev, a cutting speed of the workpiece to be cut of about 1.78 m/sec, and the workpiece had an outer diameter of about 914 mm and an inner diameter of about 254 mm. The conventional PDC of comparative example 1 was able to cut a distance of about 1600 linear feet in the workpiece prior to failure.

Comparative Example 2

A PDC was obtained that was fabricated as performed in comparative example 1. The thickness of the PCD table of the PDC was about 2.344 mm and an about 45 degree, 0.358-mm chamfer was machined in the PCD table. Then, the PCD table was acid leached to a depth of about 57 µm.

The abrasion resistance of the conventional PDC of comparative example 2 was evaluated by measuring the volume of PDC removed versus the volume of Barre granite workpiece removed, while the workpiece was cooled with water, using the same workpiece and the same test parameters as comparative example 1. As shown in FIG. 7, the abrasion resistance of the PDC of comparative example 2 was greater than that of the PDC of comparative example 1.

The thermal stability of the PCD table of the conventional PDC so-formed of comparative example 2 was also evaluated by measuring the distance cut prior to failure in the same workpiece used to test comparative example 1 and using the same test parameters, without using coolant, in a vertical turret lathe test. The conventional PDC of comparative example 2 was able to cut a distance of about 2000 linear feet in the workpiece prior to failure.

Example 3

A PDC was formed according to the following process. A PCD table was formed by HPHT sintering, in the presence of cobalt, diamond particles having an average grain size of about 19 µm. The PCD table included bonded diamond grains, with cobalt disposed within interstitial regions between the bonded diamond grains. The PCD table was leached with acid for a time sufficient to remove substantially all of the cobalt from the interstitial regions to form an at least partially leached PCD table. The at least partially leached PCD table was placed adjacent to a cobalt-cemented tungsten carbide substrate. A layer of carbonate-infiltrant material in an amount of about 0.050 grams was placed adjacent to the at least partially leached PCD table on a side thereof opposite the cobalt-cemented tungsten carbide substrate. The carbonate-infiltrant material included about 43.5 atomic percent lithium carbonate, about 31.5 atomic percent sodium carbonate, and about 25 atomic percent potassium carbonate. The at least partially leached PCD table, cobalt-cemented tungsten carbide substrate, and layer of carbonate-infiltrant material were HPHT processed in a high-pressure cubic press at a temperature of about 1400° C. and a pressure of about 5 GPa to about 7 GPa to form a PDC comprising an infiltrated PCD table bonded to the cobalt-cemented tungsten carbide substrate. The infiltrated PCD table had a thickness of about 2.36 mm and an about 45 degree, 0.378-mm chamfer was machined in the infiltrated PCD table.

The abrasion resistance of the PDC of example 3 was evaluated by measuring the volume of PDC removed versus the volume of Barre granite workpiece removed, while the workpiece was cooled with water, using the same workpiece and the same test parameters as comparative example 1. As shown in FIG. 7, the abrasion resistance of the PDC of example 3 was less than that of the PDC of comparative examples 1 and 2.

The thermal stability of the infiltrated PCD table of the PDC so-formed of example 3 was also evaluated by measuring the distance cut prior to failure in the same workpiece used to test comparative example 1 and using the same test parameters, without using coolant, in a vertical turret lathe test. The infiltrated PCD table of the PDC of example 3 was able to cut a distance greater than 4300 linear feet in the workpiece prior to failure, which was greater than the distance that the unleached and leached PDCs of comparative examples 1 and 2 were able to cut. Thus, although the abrasion resistance of the PCD table of the PDC of example 3 was less than comparative examples 1 and 2, the thermal stability was significantly greater.

Example 4

A PDC was fabricated according to the same process used to fabricate the PDC of example 3. However, about 0.10 grams of the carbonate-infiltrant material was used instead of 0.050 grams. The infiltrated PCD table also had a thickness of about 2.34 mm and an about 45 degree, 0.336-mm chamfer was machined in the infiltrated PCD table.

The abrasion resistance of the PDC of example 4 was evaluated by measuring the volume of PDC removed versus the volume of Barre granite workpiece removed, while the workpiece was cooled with water, using the same workpiece and the same test parameters as comparative example 1. As shown in FIG. 7, the abrasion resistance of the PDC of example 4 was still less than the PDCs of comparative examples 1 and 2, but the increased amount of carbonate-infiltrant material is believed to have improved the abrasion resistance over the PDC of example 3.

The thermal stability of the infiltrated PCD table of the PDC so-formed of example 4 was evaluated by measuring the distance cut prior to failure in the same workpiece used to test comparative example 1 and using the same test parameters, without using coolant, in a vertical turret lathe test. The infiltrated PCD table of the PDC of example 4 was able to cut a distance greater than 11000 linear feet in the workpiece prior to failure, which was greater than the distance than comparative examples 1 and 2 and example 3 were able to cut. Thus, although the abrasion resistance of the PCD table of the PDC of example 4 was slightly less than comparative examples 1 and 2, the thermal stability was significantly greater.

Example 5

Figure 8:
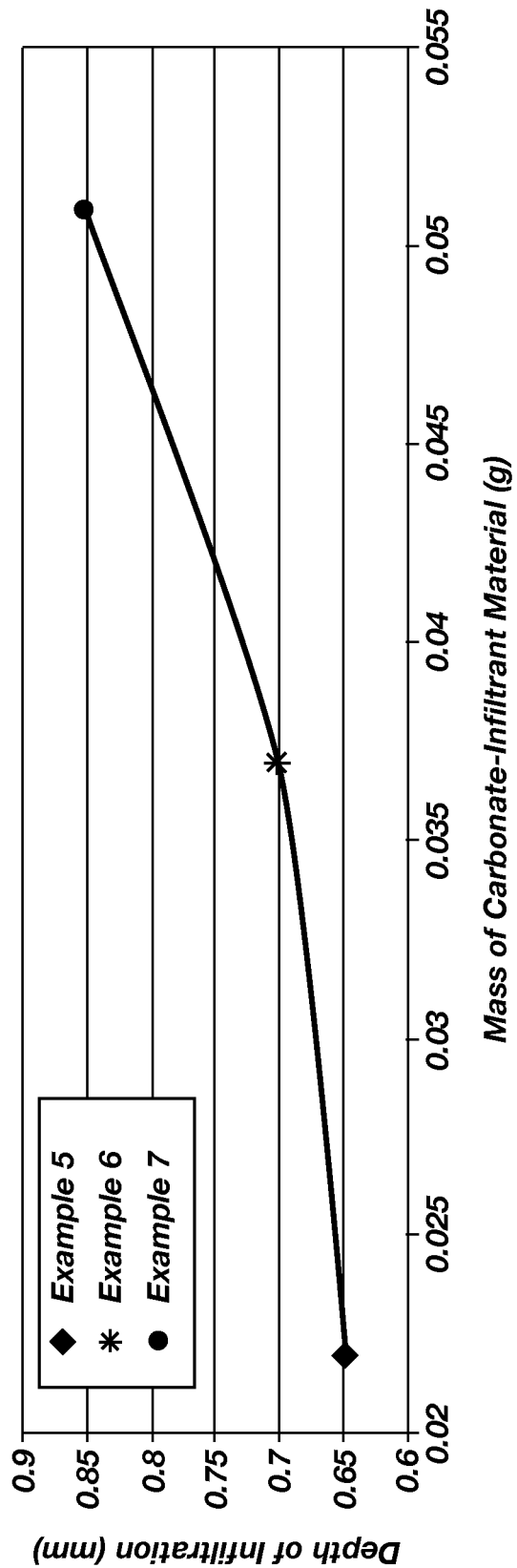
FIG. 8 is a graph of depth of infiltration versus mass of carbonate-infiltrant material for examples 5-7 according to embodiments of the invention.

A PDC was fabricated according to the same process used to fabricate the PDC of example 3. However, about 0.022 grams of the carbonate-infiltrant material was used instead of 0.050 grams. The infiltrated PCD table also had a thickness of about 2.18 mm and an about 45 degree, 0.373-mm chamfer was machined in the infiltrated PCD table. The depth of infiltration of the carbonate-infiltrant material into the infiltrated PCD table is shown in FIG. 8.

Figure 9:
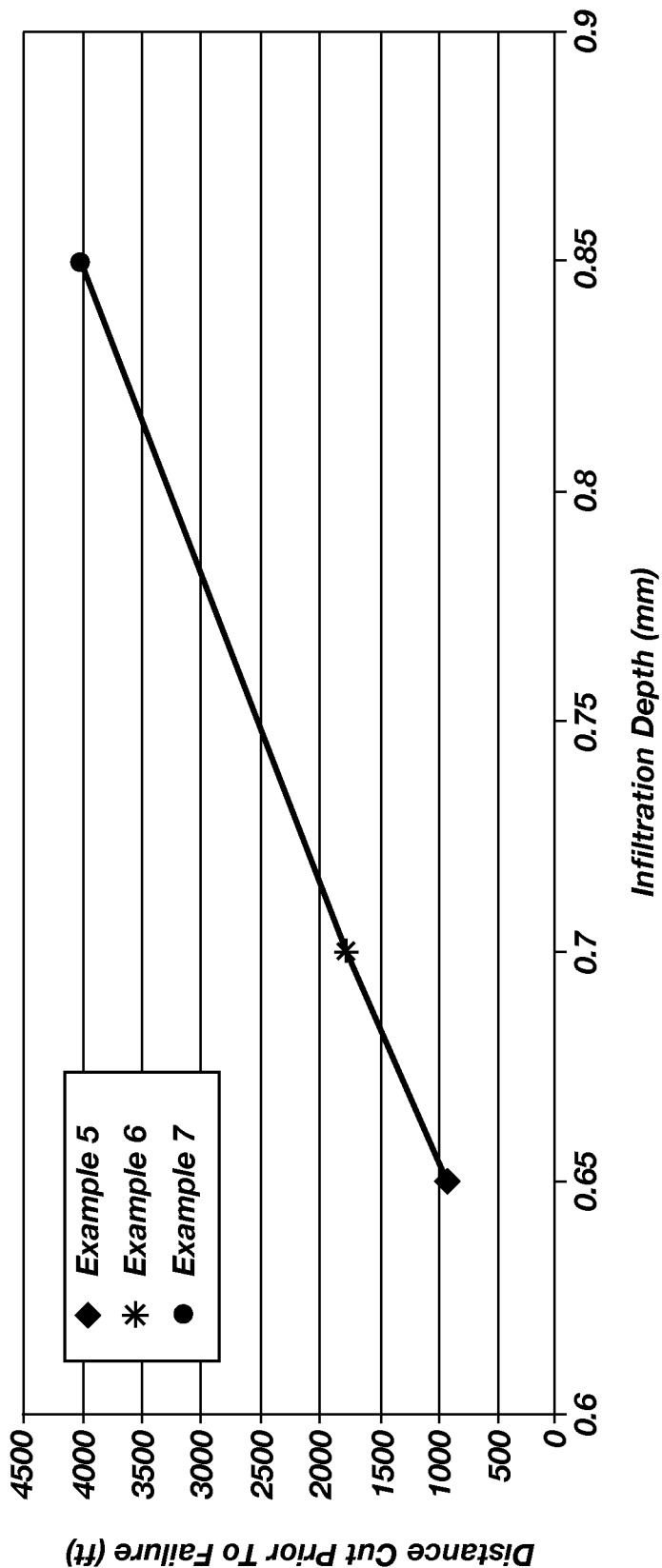
FIG. 9 is a graph of distance cut prior to failure versus infiltration depth of the carbonate-infiltrant material for examples 5-7.

The thermal stability of the infiltrated PCD table of the PDC so-formed in example 5 was also evaluated by measuring the distance cut prior to failure in a Barre granite workpiece using the same test parameters as comparative example 1, without using coolant, in a vertical turret lathe test. The thermal stability test results are shown in FIG. 9.

Figure 10:
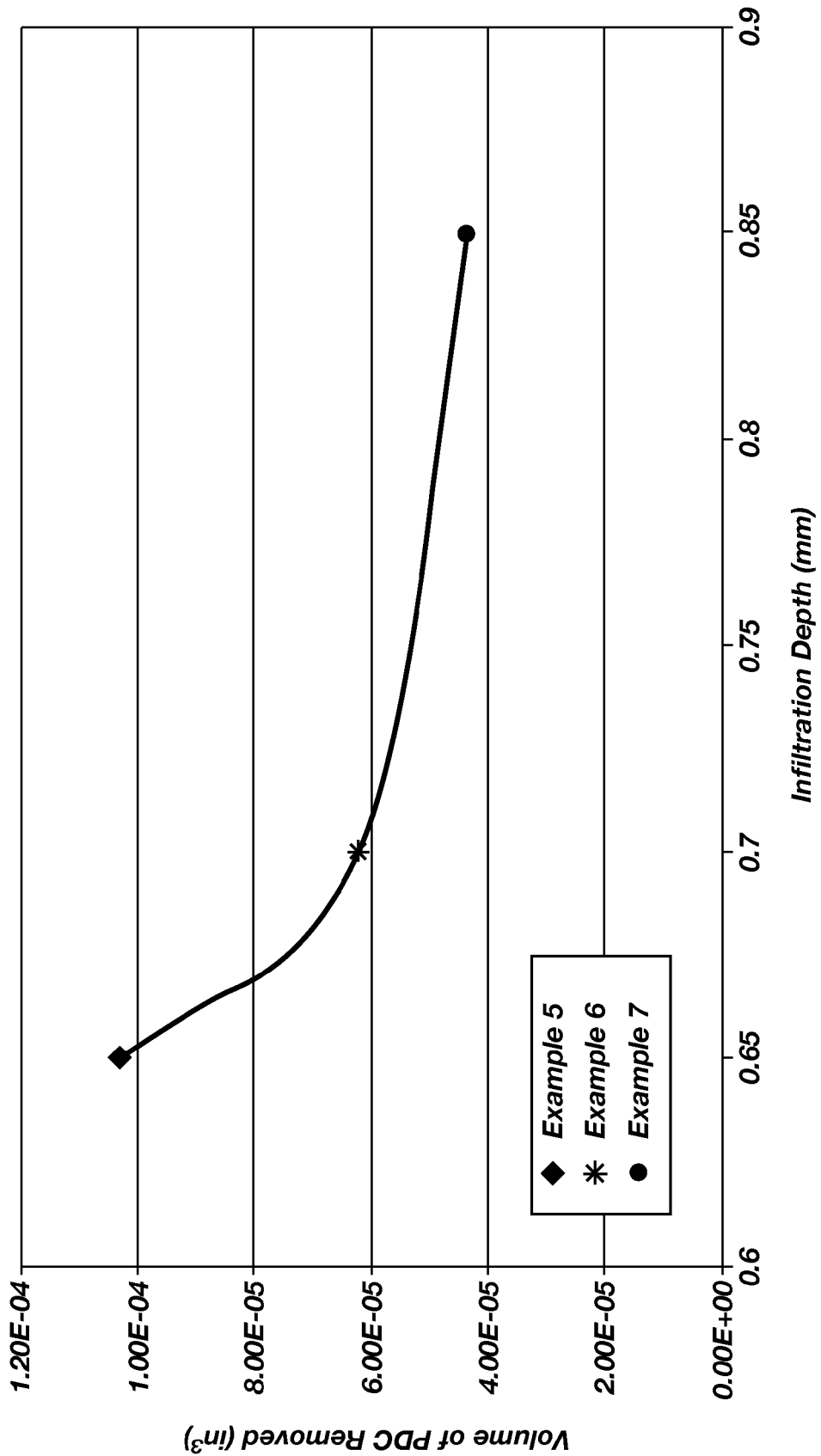
FIG. 10 is a graph of volume of PDC removed versus infiltration depth of the carbonate-infiltrant material for examples 5-7.

The abrasion resistance of the PDC of example 5 was evaluated by measuring the volume of PDC removed versus the volume of Barre granite workpiece removed, while the workpiece was cooled with water, using a Barre granite workpiece and the same test parameters as comparative example 1. The abrasion resistance test results are shown in FIG. 10.

Example 6

A PDC was fabricated according to the same process used to fabricate the PDC of example 3. However, about 0.037 grams of the carbonate-infiltrant material was used instead of 0.050 grams. The infiltrated PCD table also had a thickness of about 2.26 mm and an about 45 degree, 0.305-mm chamfer was machined in the infiltrated PCD table. The depth of infiltration of the carbonate-infiltrant material into the infiltrated PCD table is shown in FIG. 8.

The thermal stability of the infiltrated PCD table of the PDC so-formed of example 6 was also evaluated by measuring the distance cut prior to failure in the same workpiece used to test comparative example 5 and using the same test parameters, without using coolant, in a vertical turret lathe test. The thermal stability test results are shown in FIG. 9.

The abrasion resistance of the PDC of example 6 was evaluated by measuring the volume of PDC removed versus the volume of Barre granite workpiece removed, while the workpiece was cooled with water, using the same workpiece and the same test parameters as comparative example 5. The abrasion resistance test results are shown in FIG. 10.

Example 7

A PDC was fabricated according to the same process used to fabricate the PDC of example 3. However, about 0.051 grams of the carbonate-infiltrant material was used instead of 0.050 grams. The infiltrated PCD table also had a thickness of about 2.26 mm and an about 45 degree, 0.305-mm chamfer was machined in the infiltrated PCD table. The depth of infiltration of the carbonate-infiltrant material into the infiltrated PCD table is shown in FIG. 8.

The thermal stability of the infiltrated PCD table of the PDC so-formed of example 7 was evaluated by measuring the distance cut prior to failure in the same workpiece used to test comparative example 5 and using the same test parameters, without using coolant, in a vertical turret lathe test. The thermal stability test results are shown in FIG. 9.

The abrasion resistance of the PDC of example 7 was evaluated by measuring the volume of PDC removed versus the volume of Barre granite workpiece removed, while the workpiece was cooled with water, using the same workpiece and the same test parameters as comparative example 5. The abrasion resistance test results are shown in FIG. 10.

As shown in FIG. 8, the depth of infiltration into the infiltrated PCD table was determined to increase with an increasing amount of the carbonate-infiltrant material. The depth of infiltration was measured in the PCD tables of examples 5-7 using a scanning electron microscope. As shown in FIG. 9, the distance cut in the workpiece prior to failure (i.e., thermal stability) increased with increased carbonate-infiltrant material infiltration depth. As shown in FIG. 10, the volume of the PDC removed from cutting the workpiece decreased with increased carbonate-infiltrant material infiltration depth indicating of the abrasion resistance increased with increasing infiltration depth. Therefore, examples 5-7 indicate that increased depth of infiltration of the carbonate-infiltrant material into the PCD table enhances abrasion resistance and thermal stability.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises").

What is claimed is:

1. A method of manufacturing a polycrystalline diamond compact, comprising:
    providing an at least partially leached polycrystalline diamond table including a upper surface, an interfacial surface generally opposing the upper surface, and at least one lateral surface, the at least partially leached polycrystalline diamond table including a plurality of interstitial regions therein;
    positioning the at least partially leached polycrystalline diamond table so that at least a portion of the interfacial surface directly abuts a cemented carbide substrate including a metallic catalyst therein and the upper surface directly abuts at least one layer including a nonmetallic catalyst, or positioning the at least one layer to directly abut at least a portion of the interfacial surface of the at least partially leached polycrystalline diamond table and the cemented carbide substrate;
    during a high-pressure/high-temperature process, infiltrating the nonmetallic catalyst into the interstitial regions of a first region of the at least partially leached polycrystalline diamond table; and
    after the act of infiltrating the nonmetallic catalyst, during the high-pressure/high-temperature process, infiltrating the metallic-catalyst infiltrant into the interstitial regions of a second region of the at least partially leached polycrystalline diamond table;
    wherein the nonmetallic catalyst limits infiltration of the metallic-catalyst infiltrant into the at least partially leached polycrystalline diamond table to a selected infiltration depth;
    wherein the nonmetallic catalyst includes at least one material selected from the group consisting of a mixture including at least two carbonates having a eutectic or near eutectic composition, elemental phosphorus, elemental sulfur, a polycyclic aromatic hydrocarbon, and a derivative of a chlorinated hydrocarbon.

2. The method of claim 1 wherein each of the acts of infiltrating the nonmetallic catalyst into the interstitial regions of a first region of the at least partially leached polycrystalline diamond table and infiltrating the metallic-catalyst infiltrant into the interstitial regions of a second region of the at least partially leached polycrystalline diamond table is effected by subjecting the at least partially leached polycrystalline diamond table, the cemented carbide substrate, and the at least one layer to the high-pressure/high-temperature process at a temperature of about 1100° C. to about 1300° C. and a pressure of about 6 GPa to about 8 GPa.

3. The method of claim 1, further comprising removing a portion of the nonmetallic catalyst infiltrated into the at least partially leached polycrystalline diamond table.

4. A method of manufacturing a polycrystalline diamond compact, comprising:
    providing a polycrystalline diamond table including an upper surface, an interfacial surface generally opposing the upper surface, and at least one lateral surface, the polycrystalline diamond table including a plurality of bonded diamond grains defining a plurality of interstitial regions, the polycrystalline diamond table including a first region having a nonmetallic catalyst disposed interstitially between the bonded diamond grains thereof and a second region that is substantially free of the nonmetallic catalyst, the first region extending inwardly from the upper surface to an intermediate depth, the second region extending inwardly from the interfacial surface toward the upper surface;
    after the act of providing, positioning a cemented carbide substrate including a metallic catalyst therein to directly abut at least a portion of the interfacial surface of the polycrystalline diamond table; and
    after the act of positioning, infiltrating a portion of the metallic catalyst into the interstitial regions of the second region of the polycrystalline diamond table;
    wherein the nonmetallic catalyst limits infiltration of the portion of metallic catalyst into the polycrystalline diamond table to a selected infiltration depth;
    wherein the nonmetallic catalyst includes at least one material selected from the group consisting of a mixture including at least two carbonates having a eutectic or near eutectic composition, elemental phosphorous, elemental sulfur, a polycyclic aromatic hydrocarbon, and a derivative of a chlorinated hydrocarbon.

5. The method of claim 4 wherein infiltrating a portion of the metallic catalyst into the interstitial regions of the second region of the polycrystalline diamond table is effected by subjecting the polycrystalline diamond table including the nonmetallic catalyst therein and the cemented carbide substrate to a high-pressure/high-temperature process.

6. The method of claim 1 wherein the two or more carbonates include two or more alkali metal carbonates, two or more alkaline earth metal carbonates, or combinations thereof.

7. The method of claim 1 wherein the polycyclic aromatic hydrocarbon includes at least one member selected from the group consisting of naphthalene, anthracene, pentacene, perylene, coronene, derivatives thereof, and combinations thereof.

8. The method of claim 1 wherein the first region of the at least partially leached polycrystalline diamond table comprises a residual amount of metallic catalyst.

9. The method of claim 1 wherein the first region of the infiltrated polycrystalline diamond table extends from an upper surface thereof to an intermediate depth of about 0.20 mm to about 1.5 mm.

10. The method of claim 4 wherein the two or more carbonates include two or more alkali metal carbonates, two or more alkaline earth metal carbonates, or combinations thereof.

11. The method of claim 4 wherein the polycyclic aromatic hydrocarbon includes at least one member selected from the group consisting of naphthalene, anthracene, pentacene, perylene, coronene, derivatives thereof, and combinations thereof.

12. The method of claim 4 wherein the first region of the at least partially leached polycrystalline diamond table comprises a residual amount of metallic catalyst.

13. The method of claim 4 wherein the plurality of bonded diamond grains of the polycrystalline diamond table exhibit diamond-to-diamond bonding therebetween.

14. The method of claim 4 wherein the first region of the polycrystalline diamond table extends from an upper surface thereof to an intermediate depth of about 0.20 mm to about 1.5 mm.

15. A method of manufacturing a polycrystalline diamond compact, comprising:

providing a polycrystalline diamond table including an upper surface, an interfacial surface generally opposing the upper surface, and at least one lateral surface, the polycrystalline diamond table including a plurality of bonded diamond grains exhibiting diamond-to-diamond bonding therebetween and defining a plurality of interstitial regions, the polycrystalline diamond table including a first region having a nonmetallic catalyst disposed interstitially between the bonded diamond grains thereof and a second region that has less of the nonmetallic catalyst than the first region, the first region extending inwardly from the upper surface to an intermediate depth, the second region extending inwardly from the interfacial surface toward the upper surface;

after the act of providing, positioning a cemented carbide substrate including a metallic catalyst therein to directly abut at least a portion of the interfacial surface of the polycrystalline diamond table; and after the act of positioning, infiltrating a portion of the metallic catalyst into the interstitial regions of the second region of the polycrystalline diamond table;

wherein the nonmetallic catalyst limits infiltration of the portion of metallic catalyst into the polycrystalline diamond table;

wherein the nonmetallic catalyst includes at least one material selected from the group consisting of a mixture including at least two carbonates having a eutectic or near eutectic composition, elemental phosphorous, elemental sulfur, a polycyclic aromatic hydrocarbon, and a derivative of a chlorinated hydrocarbon.

16. The method of claim 15 wherein the second region of the polycrystalline diamond table is substantially free of the nonmetallic catalyst.

* * * * *